(12) United States Patent
Seger et al.

(10) Patent No.: US 10,009,521 B2
(45) Date of Patent: Jun. 26, 2018

(54) CAMERA, IN PARTICULAR USABLE IN A VEHICLE, AND A METHOD FOR PRODUCING SUCH A CAMERA

(71) Applicant: Robert Bosch GmbH, Stuttgart (DE)

(72) Inventors: Ulrich Seger, Leonberg-Warmbronn (DE); Nikolai Bauer, Moeglingen (DE); Uwe Apel, Neckartailfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/321,087

(22) PCT Filed: Jun. 8, 2015

(86) PCT No.: PCT/EP2015/062663
§ 371 (c)(1),
(2) Date: Dec. 21, 2016

(87) PCT Pub. No.: WO2015/197343
PCT Pub. Date: Dec. 30, 2015

(65) Prior Publication Data
US 2017/0155808 A1    Jun. 1, 2017

(30) Foreign Application Priority Data
Jun. 23, 2014   (DE) .......................... 10 2014 212 016

(51) Int. Cl.
*H04N 5/225*    (2006.01)
*G03B 17/55*    (2006.01)

(52) U.S. Cl.
CPC ........... *H04N 5/2252* (2013.01); *G03B 17/55* (2013.01); *H04N 5/2253* (2013.01); *H04N 5/2254* (2013.01); *H04N 5/2251* (2013.01)

(58) Field of Classification Search
CPC .. H04N 5/2252; H04N 5/2254; H04N 5/2253; H04N 5/2251; B60R 1/04; B60R 2011/004
See application file for complete search history.

(56) References Cited

U.S. PATENT DOCUMENTS

2010/0097519 A1* 4/2010 Byrne ...................... B60R 1/00
                                                    348/373

FOREIGN PATENT DOCUMENTS

| DE | 102013200966 A1 | 8/2013 |
| DE | 102012222905 A1 | 6/2014 |

OTHER PUBLICATIONS

International Search Report dated Aug. 10, 2015, of the corresponding International Application PCT/EP2015/062663 filed Jun. 8, 2015.

* cited by examiner

*Primary Examiner* — Ahmed A Berhan
(74) *Attorney, Agent, or Firm* — Norton Rose Fulbright US LLP; Gerard Messina

(57) ABSTRACT

A camera, in particular for a vehicle, the camera having: an imager module which has a sensor carrier with a front side and a backside, an image sensor being fastened to the front side of the sensor carrier, an objective holder which is connected to the sensor carrier, and an objective which is accommodated in the objective holder, as well as a camera housing in which the imager module is accommodated. The camera housing has a front housing part including contact areas, at least one fixation means resting against the backside of the sensor carrier, and the imager module is fixated with respect to the contact areas and the fixation means is fastened to the front housing part by fastening means. In addition, a method for producing the camera is provided.

24 Claims, 5 Drawing Sheets

CAMERA, IN PARTICULAR USABLE IN A VEHICLE, AND A METHOD FOR PRODUCING SUCH A CAMERA

FIELD

The present invention relates to a camera which is able to be used especially in a vehicle, and to a method for producing such a camera.

BACKGROUND INFORMATION

Cameras usually include an imager module, which has a sensor carrier, an image sensor mounted on the sensor carrier, and also an objective holder connected to the sensor carrier, as well as an objective that is inserted into a tube area of the objective holder in the longitudinal direction. Focusing may be achieved by a longitudinal adjustment of the objective in the objective holder, for instance using a thread pitch, with a subsequent fixation by an adhesive agent or by mechanical means.

Such an imager module is subsequently accommodated in a camera housing which serves as mechanical protection and, for instance, holds a circuit board device such as a circuit board with additional electronic components, and enables an attachment, for instance in the interior of a vehicle.

However, the relative positioning and alignment of both the image sensor in relation to the objective, i.e., the adjustment of the imager module, and the relative position of the imager module in relation to the camera housing, are generally quite complicated and lead to high tolerances.

Furthermore, generally, the heat dissipation of the image sensor or the cooling of the image sensor in order to ensure the excellent optical characteristics of the image sensor is quite involved.

SUMMARY

According to the present invention, an imager module is placed against a front housing part in order to position the imager module relative to the housing part. At least one fixation means is used for retaining the imager module on the front housing part; the imager module is advantageously pressed against the front housing part.

In the process, in particular the sensor carrier or the objective holder (3) may be pressed against contact areas of the front housing part.

On its own, this already achieves a number of advantages:

One advantages lies in the improvement in the heat dissipation away from the image sensor. For instance, the sensor carrier may be developed in the form of a metal plate and the image sensor may be mounted directly on the front side of the sensor carrier; the front housing part, too, may be produced from metal, either completely or partially. Because the sensor carrier rests directly against the front housing part, excellent cooling of the image sensor via its backside is made possible. Via the sensor carrier and the front housing part, direct heat conduction is able to be obtained by way of metallic regions, thereby achieving excellent heat dissipation. The front housing part may have a large outer surface and in an advantageous manner largely covers the imager module in the circumferential direction toward the outside.

The fixation means, such as a fixation sheet metal, may press against the backside of the sensor carrier, in particular, and advantageously be fixed in place in the front housing part with the aid of fastening means such as screws. Excellent cooling or an excellent thermal linkage is achieved in this way since a thermal conduction into the front housing part via the metallic fastening means is able to take place. This may be the case both with direct contact of the sensor carrier and with contact of the objective holder on the front housing part.

Additional advantages are the improved alignment or adjustment of the imager module itself on the one hand, and the improved alignment or adjustment of the imager module relative to the camera housing on the other.

In regards to the advantage of the improved alignment or adjustment of the imager module itself, for one:

The adjustment of the imager module itself can be accomplished through guide means in the tube area of the objective holder, for example through guide ribs that extend in the axial direction or in the direction of the optical axis. Thus, for example, the objective holder may be fixed in place on the front side of the sensor carrier with the aid of an adhesive layer, and the lateral position, i.e., the position perpendicular to the optical axis, may be realized by positioning the image sensor relative to the guide means. The image sensor is therefore aligned. Since the guide means are provided for guidance purposes and for the definite accommodation of the objective, the position of the image sensor can thus be adjusted directly to the objective.

As a result, a direct alignment of the objective relative to the image sensor is possible without first aligning the sensor carrier in relation to the image sensor, for example, and the objective having to be aligned subsequently, with play, in relation to the sensor carrier. An optical axis may thus be created which coincides with, or which combines, the objective axis, the tube axis of the objective holder and the center-point normal of the image sensor, with sufficient precision.

In regards to the advantage of the improved alignment of the relative position of the imager module with respect to the camera housing:

Placing the imager module via mounting areas formed on its front side directly against contact areas of the front housing part, already makes it possible to establish two angular positions, that is to say, the rotational position about axes of rotation that are situated perpendicular to the optical axis; in an installation in a vehicle, they represent the pitch-angle position and the yaw-angle position. Three mounting areas and contact areas are advantageously provided in each case, which therefore specify a contact plane in a precise manner.

The specification of the further angular position, i.e., a rotational position about the optical axis, which thus represents a roll-angle position, in particular, may take place once the sensor carrier has been joined to the housing part, for which purpose the imager module is able to be rotated relative to the front housing part. Suitable fitting contours, which are to be aligned at a suitable alignment geometry on the housing part, may be provided on the sensor carrier; as a result, an optical alignment of suitable structures is able to be performed. This can thus be done by a simple rotation or by sliding contact of the mounting areas along the contact areas, prior to the final fixation.

A simple and rapid development is therefore possible, which furthermore allows for excellent thermal linkage of the image sensor and for cooling of the image sensor via a metallic housing part, especially in a direct optical alignment and adjustment.

The image sensor may therefore be passively aligned, via an alignment of the sensor carrier initially relative to the object holder and then relative to the housing part.

DETAILED DESCRIPTION OF EXAMPLE EMBODIMENTS

Figure 1:
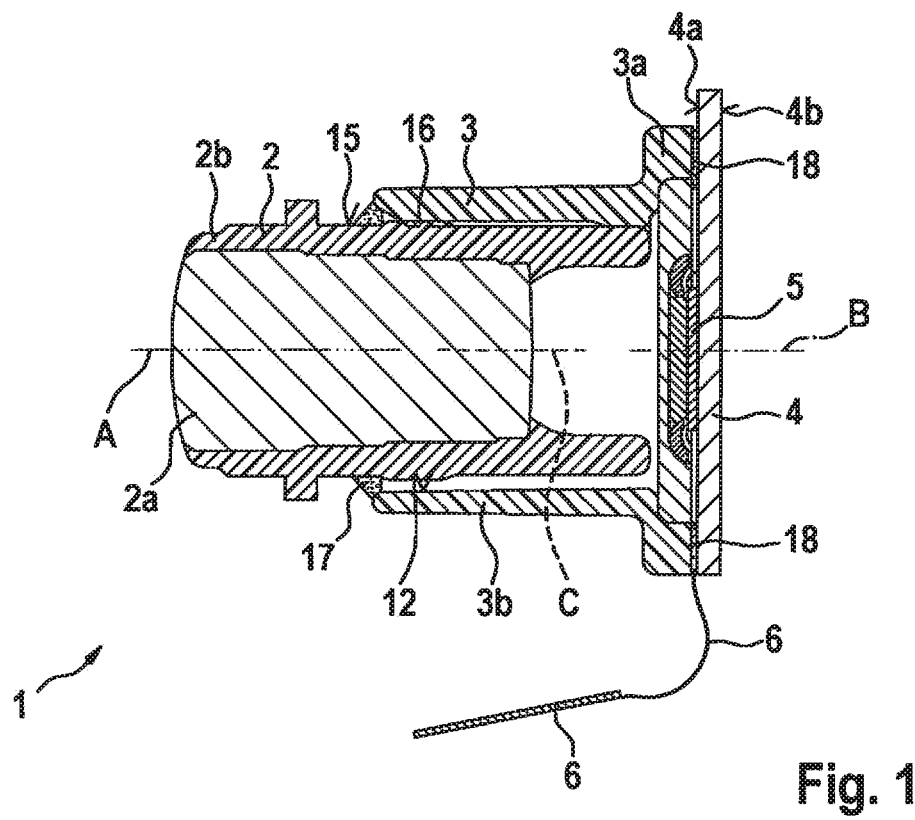
FIG. 1 shows an imager module of the camera according to one specific embodiment of the present invention.
Figure 3:
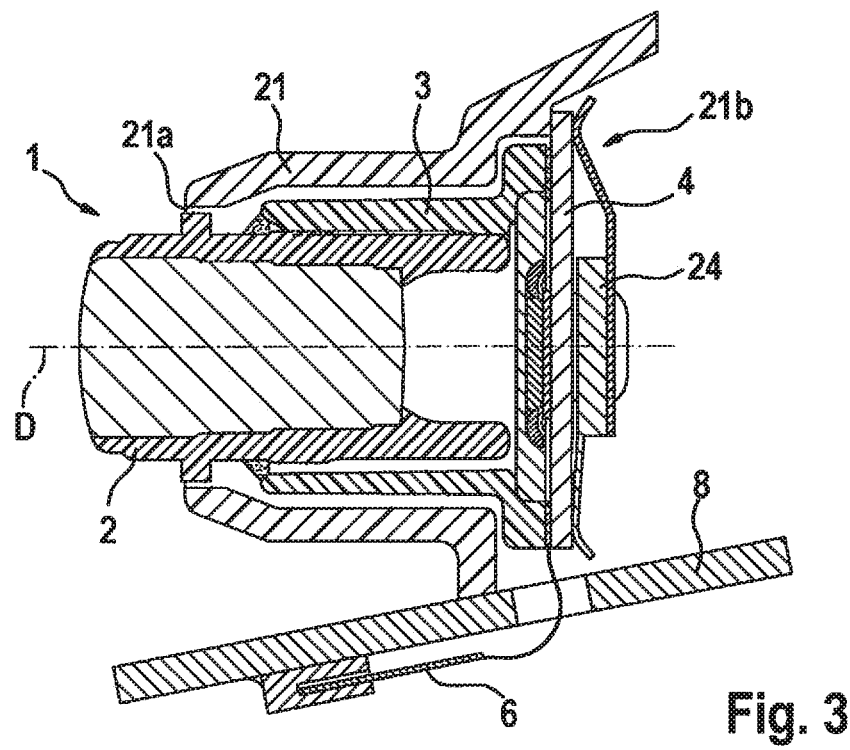
FIG. 3 shows a first step for creating the camera by the placement of a fixation device and a circuit board.

As shown in FIG. 1, an imager module 1 has an objective 2, an objective holder 3 which accommodates objective 2, a sensor carrier 4 having a front side 4a and a backside 4b, and an image sensor 5 which is mounted on front side 4a of sensor carrier 4. A metal plate, in particular, may be selected as sensor carrier 4, on which a conductor device, such as a flex cable 6 (flexible conduction band), is fixed in place for the contacting of image sensor 5; flex cable 6 is used for the subsequent contacting on a circuit-board device such as shown in FIG. 3, for instance a circuit board 8.

For example, objective holder 3 is produced as an injection-molded part from a plastic material and has an objective-holder mounting area 3a for the placement on sensor carrier 4, and a tube area 3b, into which objective 2, which has one or more lenses 2a and a lens mount 2b, for instance, is inserted.

Tube area 3b has an inner surface 12 on which a plurality of guide ribs 14, such as three, which serve as guide means, are situated in distributed fashion in the circumferential direction, for example in an axially symmetrical manner, or in other words, in a 120° placement. However, in this context it is also possible to select placements that are not axially symmetrical. Corresponding guide grooves 16, in which guide ribs 14 are accommodated, are formed on an outer side 15 of lens mount 2b. Objective 2 is therefore able to be inserted into tube area 3b in a longitudinal direction.

On account of the position of guide ribs 14, objective 2 or the objective body thus is clearly defined in its position; guide ribs 14 are subsequently used as reference for the lateral alignment of image sensor 5.

Figure 2:
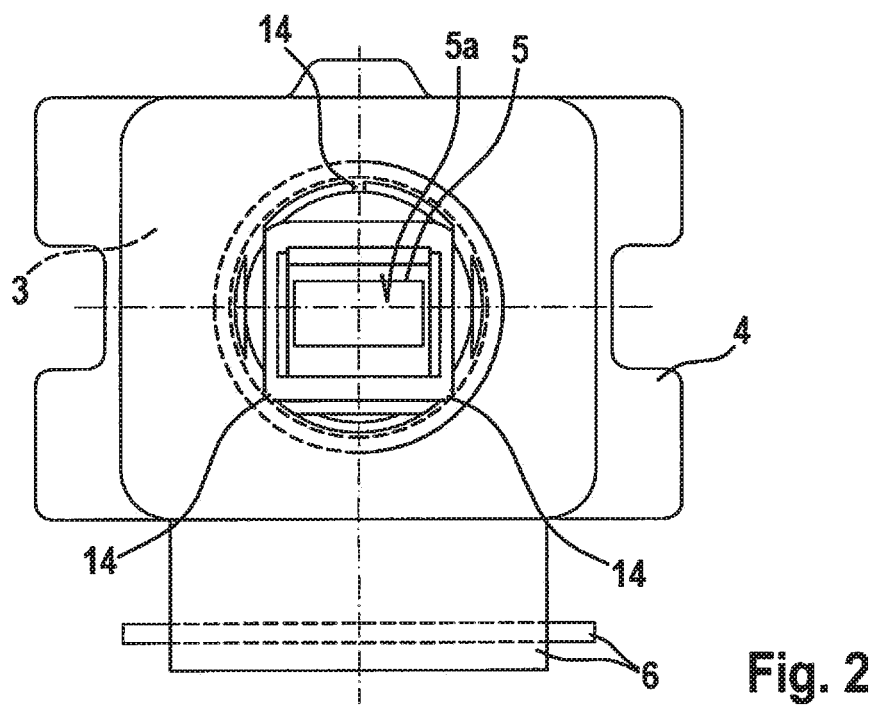
FIG. 2 shows a rear view of the imager module.

Image sensor 5 has a center point or a center-point normal B; objective 2 has an objective axis A; in addition, tube area 3b has a tube axis C. Thus, the goal of the adjustment during the assembly of imager module 1 is for the two axes A and C and center-point normal B to coincide and to form a shared optical axis D. The lateral positions and the angle adjustments, i.e. with regard to tilting, are therefore to be adjusted. Because of guide ribs 14 of tube area 3b of objective holder 3, objective 2 is able to be positioned in a defined manner so that axes of symmetry A and C already coincide. During an assembly, image sensor 5, in particular its sensitive sensor surface 5a, is therefore able to be aligned relative to guide ribs 14, and thus relative to tube axis C; this alignment can be gathered especially from the rear view of FIG. 2.

Therefore, image sensor 5 is first mounted on sensor carrier 4, which is realized as a steel plate, for instance by a circumferential adhesive layer 18 between sensor carrier 4 and objective-holder mounting area 3a of objective holder 3; this also achieves sealing of the back lens space and protection of image sensor 5 since it is completely surrounded by objective holder 3. Flex cable 6 is also advantageously fixated by adhesive layer 18, or this passage is sealed.

Then, in the following production step, objective 2 is introduced into tube area 3b of objective holder 3; focusing advantageously takes place in the process while a test pattern is detected and the image signals of image sensor 5 are evaluated. Following this, a fixation is implemented, for instance by an adhesive agent 17 applied from the front, which is introduced between the front end of tube area 3b and lens mount 2b and also ensures sealing of the rear lens space or sealing of image sensor 5 which is freely exposed toward the front. Other fixations are possible as well in principle.

Imager module 1 developed in this way is subsequently installed in a camera housing 20 and fixed in place. Camera housing 20 has a front housing part 21 and, for instance, a first housing shell 22 and a second housing shell 23; a fixation element 24, such as a fixation sheet metal 24, circuit board 8 and fastening means 25, such as screws, are provided in addition.

Front housing part 21 is made of metal and developed in tubular or cylindrical shape; it has a front opening 21a and a rear opening 21b so that imager module 1 is able to be inserted through the rear opening or entry opening 21b into front housing part 21 and projects from front opening 21a with objective 2. In the process, contact is established and a fixation of imager module 1 takes place through a contact establishment with at least three mounting areas 28a, 28b and 28c or 128a, 128b, 128c at corresponding contact areas 30a, 30b and 30c of front housing part 21, fixation sheet metal 24 pressing against backside 4b of sensor carrier 4 in the process.

Figure 6:
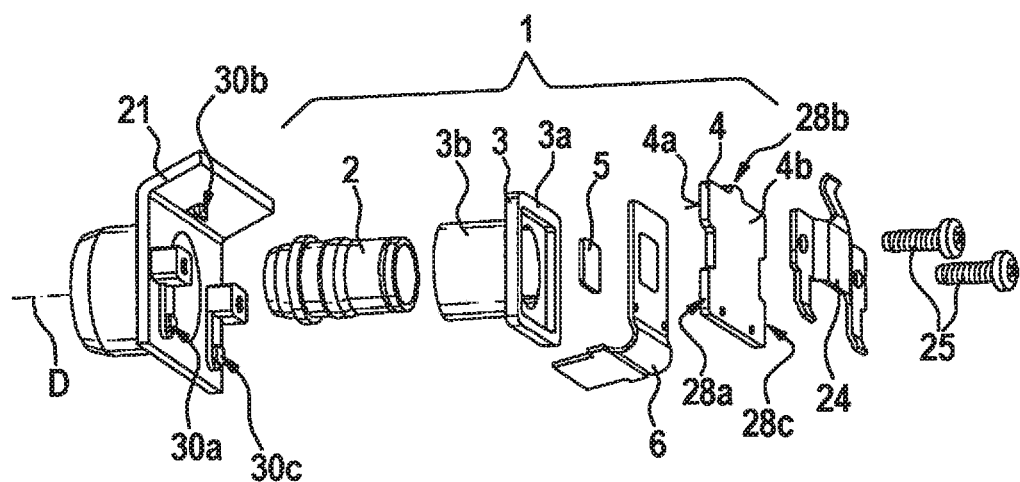
FIG. 6 shows an exploded view of the imager module.
Figure 7:
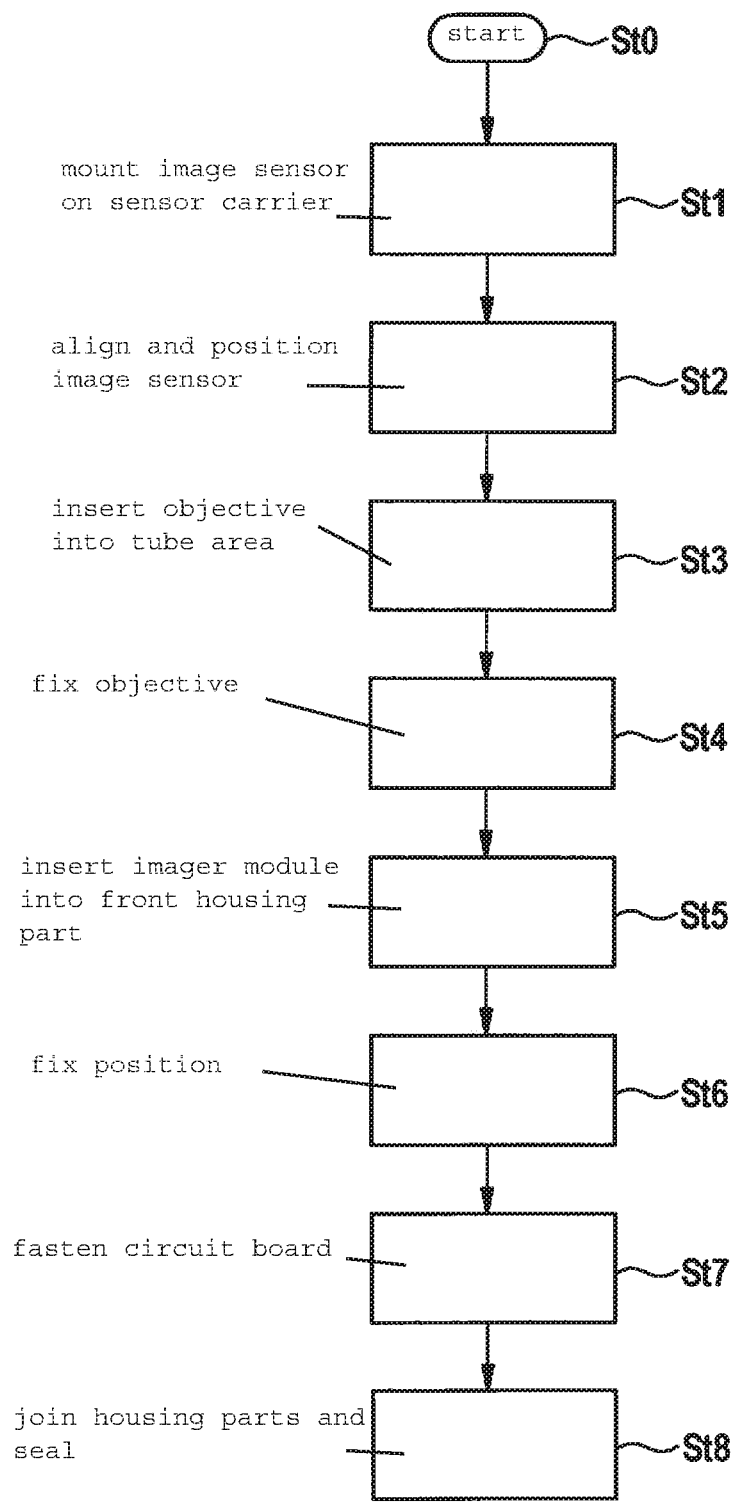
FIG. 7 shows a flow diagram of the method of the present invention.

Fixation sheet metal 24 is fastened to front housing part 21, for instance in receiving domes 27 with threads 27a of front housing part 21; two screws 25, for instance, are used for this purpose, which lie outside the drawing plane in FIG. 3 and are visible in the perspective exploded view of FIG. 6, for example. In an advantageous manner, they are slightly tensioned so that the system shown in FIG. 3 is joined under tension in the direction of optical axis D.

Figure 5:
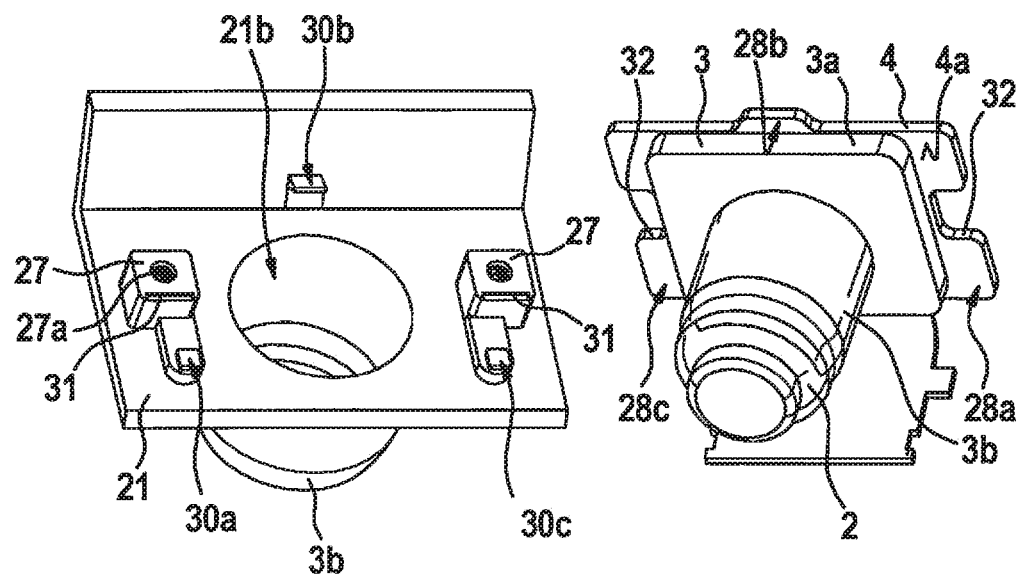
FIG. 5 shows modules of the imager module prior to the assembly.
Figure 8:
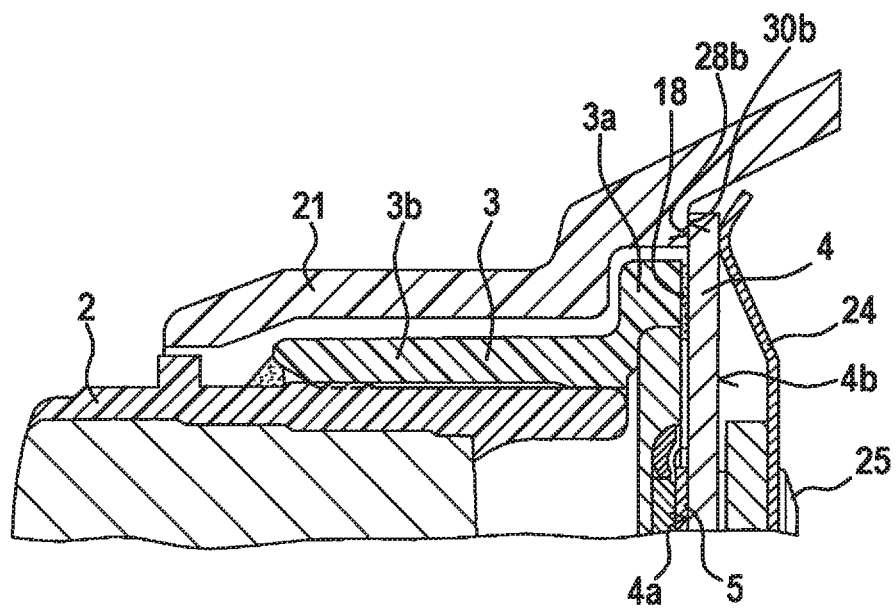
FIG. 8 shows a cut-away enlargement from FIG. 1 according to a first specific embodiment.
Figure 9:
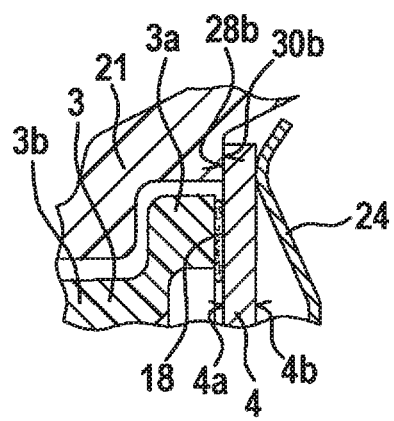
FIG. 9 shows a cut-away enlargement from FIG. 8.

In the specific embodiment shown in FIGS. 8 and 9, mounting areas 28a, 28b, 28c are developed on front side 4a of sensor carrier 4. With the aid of mounting areas 28a, 28b, 28c and contact areas 30a, 30b, 30c, positioning with respect to the pitch angle position and the yaw angle position takes place, i.e., in angular positions featuring an axis of rotation perpendicular to optical axis D. The further fixation in the roll angle position, i.e., the tilting or rotary position with respect to optical axis D according to FIG. 5 is achieved in accordance with the dash-dot lines by positioning fitting contours 32, i.e., visible edges, of sensor carrier 4, for example, in relation to an alignment geometry 31 of front housing part 21. For example, arbor domes 27 may be used in this case for forming alignment geometry 31 on front housing part 21. Accordingly, recesses, for instance, are developed on sensor carrier 4 as fitting contours 32.

During the assembly, sliding contact of mounting areas 28a, 28b, 28c at contact areas 30a, 30b, 30c, that is to say, relative twisting of sensor carrier 4 jointly with entire imager module 1 in relation to front housing part 21, may therefore take place so that fitting contours 32 and alignment geometry 31 match with regard to the angular position, e.g., are noticeably aligned.

Cooling of image sensor 5 thus takes place directly via front side 4a of sensor carrier 4, and from sensor carrier 4 by way of its three mounting areas 28a, 28b and 28c to corresponding contact areas 30a, 30b and 30c of metallic front housing part 21 on the one hand, and via backside 4b of sensor carrier 4 and fixation sheet metal 24 as well as metallic screws 25 into metallic front housing part 21 on the other, the latter in turn being cooled by its large outer surface.

Figure 4:
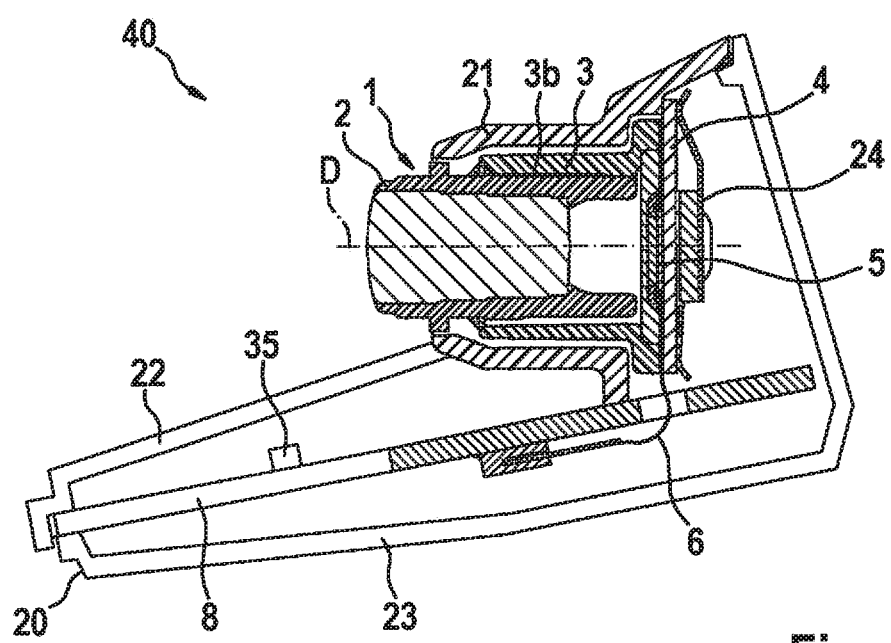
FIG. 4 shows the camera subsequently created.

Circuit board 8 may advantageously be fastened to or accommodated by front camera housing 21, for instance through a recess in circuit board 8 or through a form-fitting engagement from behind, or by latching. Flex cable 6 may thus be incorporated into or on circuit board 8 for contacting with further electronic components 35 on circuit board 8, as sketched in FIG. 4. Provided as electronic components 35 may be a control device, in particular, and also connection devices for a data connection such as a vehicle-internal data bus. Front housing part 21 is furthermore accommodated in housing shells 22 and 23, which lock into each other, for example, or which accommodate circuit board 8 between them.

Camera 40 can thus be developed at relatively low expense and by a suitable fixation in the angular positions and positionings.

Figure 10:
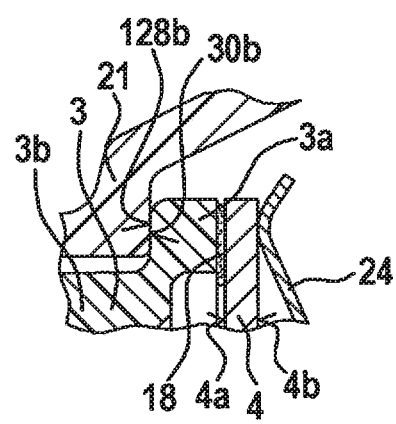
FIG. 10 shows a cut-away enlargement according to a specific embodiment as an alternative to FIGS. 8 and 9.

The specific embodiment of FIG. 10 is provided as an alternative to the specific embodiment of FIGS. 8 and 9. Here, imager module 1 together with objective holder 3 is pressed against front housing part 21. Thus, three mounting areas 128a, 128b, 128c, of which only upper mounting area 128b is shown in FIG. 10, are developed on a front side of objective holder 3, such as on the front side of its widened objective-holder mounting area 3a; they are resting against contact areas 30a, 30b, 30c of front housing part 21. The afore-described adjustment may take place here in the same way. Cooling of image sensor 5 continues to take place via sensor carrier 4, fixation means 24 and screws 25, to front housing part 21.

A method according to the present invention for producing camera 40 according to the invention thus includes, for instance, the following steps:

After the start in St0, in which the individual components shown in FIG. 6 are made available, image sensor 5 is mounted with flex cable 6 on sensor carrier 4 according to step St1, and image sensor 5 will be, or is, contacted with flex cable 6 in the conventional manner, in step St2, image sensor 5, already fastened to sensor carrier 4, is aligned and positioned with respect to guide ribs 14 used for the alignment, so that the relative alignment of tube axis C in relation to center-point normal B of image sensor 5 is ensured, and sensor carrier 4 is subsequently fixed in place on objective holder 3 by developing adhesive layer 18, whereupon according to step St3, objective 2 is inserted into tube area 3b of objective holder 3 in the longitudinal direction, or in the direction of objective axis A, the process advantageously including focusing.

The attained longitudinal position of objective 2 is fixated in step St4 by adhesive agent 17.

Imager module 1 is therefore already completed. The installation of imager module 1 in camera housing 20 is carried out subsequently:

According to step St5, imager module 1 is inserted through rear opening 21b into front housing part 21 so that objective 2 projects toward the front from front opening 21a; sealing is basically not required here. In this step St5, mounting areas 28a, 28b, 28c on front side 4a of sensor carrier 4 are placed against contact areas 30a, 30b, 30c of front housing part 21, and the correct roll angle position is adjusted by rotating imager module 1 about optical axis D, in that fitting contours 32 on sensor carrier 4 are aligned with, or correspond to, alignment geometry 31 on front camera housing part 21.

In step St6, the position thus attained is then fixated by placing fixation sheet metal 24 on backside 4b of sensor carrier 4 and fixing it in place with the aid of screws 25, the screws being screwed into receiving domes 17 so that slight tensioning may advantageously be present in the axial direction. The slight tensioning does not affect the optical characteristics, however, since fixation sheet metal 24 is resting against sensor carrier 4 in the center and in lateral regions, and sensor carrier 4 itself is developed as a metal plate or stiffener having high rigidity.

Then, in step St7, circuit board 8 may be fastened to front housing part 21, or it is appropriately installed already in advance. Flex cable 6 is advantageously contacted on circuit board 8.

Then, in step St8, camera 40 may be finished in that housing shells 22 and 23 are joined accordingly and hermetic sealing is achieved as a result.

What is claimed is:
1. A camera for a vehicle, comprising:
   an imager module which includes:
      a sensor carrier including a front side and a backside;
      an image sensor which is fastened to the front side of the sensor carrier;
      an objective holder connected to the sensor carrier; and
      an objective which is accommodated in the objective holder; and
   a camera housing in which the imager module is accommodated, the camera housing including:
      a front housing part including contact areas; and
      a rear housing part that is fastened to the front housing part of the camera housing and rests against the backside of the sensor carrier of the imager module and thereby presses the imager module against the contact areas of the front housing part to fix the imager module, which is arranged between the front housing part and the rear housing part, to the front housing part of the camera housing.

2. The camera as recited in claim 1, wherein the rear housing part exerts an elastic spring force against the backside of the sensor carrier and presses the imager module in a direction of an optical axis of the imager module against the contact areas of the front housing part.

3. The camera as recited in claim 1, wherein the sensor carrier has on its front side mounting areas which rest against the contact areas.

4. The camera as recited in claim 1, wherein the objective holder has mounting areas which rest against the contact areas.

5. The camera as recited in claim 1, wherein the front housing part surrounds the objective holder and a portion of the objective in a circumferential direction about the optical axis.

6. The camera as recited in claim 1, wherein:
   the objective holder has a tube area in which the objective is accommodated;
   guide ribs:
      are on an inner surface of the tube area;

extend in a direction of an optical axis of the imager module; and
are accommodated in guide receptacles on an outer side of the objective for a longitudinal adjustment of the objective in the tube area along the optical axis and for focusing; and
the sensor carrier with the image sensor is alignable by the guide ribs at least one of (a) in lateral directions perpendicular to the optical axis and (b) rotationally about the optical axis.

7. The camera as recited in claim 1, wherein the objective holder is fixed in place on the front side of the sensor carrier with the aid of an adhesive layer extending in the circumferential direction.

8. A method for producing a camera that includes an imager module and a separate camera housing, the camera housing including a front housing part with contact areas and a rear housing part, the method comprising:
providing the imager module, wherein the imager module includes:
a sensor carrier including (a) a front side with mounting areas and (b) a backside;
an image sensor mounted on the front side of the sensor carrier;
an objective holder fixed in place on the sensor carrier; and
an objective accommodated in the objective holder;
providing the front housing part;
inserting the imager module into the front housing part, with the mounting areas of the sensor carrier being placed on or joined to the contact areas of the front housing part in a direction of an optical axis of the imager module;
resting the rear housing part against the backside of the sensor carrier; and
while the rear housing part is resting against the backside of the sensor carrier with the imager module arranged between the rear housing part and the front housing part, fastening the rear housing part to the front housing part, thereby pressing the mounting areas against the contact areas, which fixes a position of the imager module relative to the front housing part of the camera housing.

9. The method as recited in claim 8, further comprising, after the fastening, the camera housing is closed by placing further housing parts on the front housing part.

10. The method as recited in claim 8, wherein the objective holder is fastened to the front side of the sensor carrier with the aid of an adhesive layer that extends in a circumferential direction about the optical axis.

11. The method as recited in claim 8, wherein:
the objective holder includes a tube area in which the objective is accommodated;
guide ribs for guiding the objective along the optical axis:
are on an inner surface of the tube area; and
extend in a direction of the optical axis;
the image sensor is aligned relative to the objective by the guide ribs aligning the sensor carrier at least one of (a) in a lateral direction perpendicular to the optical axis and (b) rotationally about the optical axis; and
the method further comprises longitudinally adjusting the objective in the tube area, thereby setting a focusing.

12. The method as recited in claim 8, wherein the fastening of the rear housing part to the front housing part is by tensioning.

13. A camera for a vehicle, comprising:
an imager module which includes:
a sensor carrier including a front side and a backside;
an image sensor which is fastened to the front side of the sensor carrier;
an objective holder connected to the sensor carrier; and
an objective which is accommodated in the objective holder; and
a camera housing in which the imager module is accommodated, the camera housing including:
a front housing part including contact areas; and
a rear housing part that is fastened to the front housing part and rests against the backside of the sensor carrier of the imager module, thereby fixing the imager module against the contact areas of the front housing part;
wherein at least one of:
(a) the sensor carrier and the front housing part are metal to dissipate heat from the image sensor via the sensor carrier to the front housing part;
(b) the contact areas include three contact areas, the objective holder or a front side of the sensor carrier includes three mounting areas that rest against the three contact areas of the front housing part, and the imager module rests against the camera housing only in the three mounting areas;
(c) formed on the sensor carrier are fitting contours that, for specifying a roll angle position of the imager module relative to the front housing part, are alignable to an alignment geometry of the front housing part by rotation about an optical axis of the imager module; and
(d) the objective holder includes a tube area in which the objective is accommodated, and at least three guide ribs, by which the sensor carrier with the image sensor is alignable at least one of (i) in lateral directions perpendicular to the optical axis and (ii) rotationally about the optical axis:
are distributed in a circumferential direction on an inner surface of the tube area;
extend in a direction of the optical axis of the imager module; and
are accommodated in respective guide receptacles on an outer side of the objective for a longitudinal adjustment of the objective in the tube area along the optical axis and for focusing.

14. The camera as recited in claim 13, wherein the sensor carrier and the front housing part are metal to dissipate heat from the image sensor mounted on the sensor carrier via the sensor carrier to the front housing part.

15. The camera as recited in claim 14, wherein the sensor carrier is a metal plate.

16. The camera as recited in claim 14, wherein the front housing part is one of a lathe-cut metal part or an extruded part.

17. The camera as recited in claim 14, wherein the rear housing part is made from metal, and at least one metal screw extends from the rear housing part through the sensor carrier and is fastened to the front housing part for heat dissipation from the backside of the sensor carrier via the rear housing part and the screw to the front housing part.

18. The camera as recited in claim 13, wherein:
the contact areas include the three contact areas;
the objective holder includes the three mounting areas that rest against the three contact areas of the front housing part; and the imager module rests against the camera housing only in the three mounting areas.

19. The camera as recited in claim 13, wherein, formed on the sensor carrier are the fitting contours that, for specifying the roll angle position of the imager module relative to the front housing part, are alignable to the alignment geometry of the front housing part by the rotation about an optical axis of the imager module.

20. The camera as recited in claim 13, wherein:
the objective holder includes the tube area in which the objective is accommodated, and at least three guide ribs, by which the sensor carrier with the image sensor is alignable at least one of (i) in the lateral directions perpendicular to the optical axis and (ii) rotationally about the optical axis:
   are distributed in the circumferential direction on the inner surface of the tube area;
   extend in the direction of the optical axis of the imager module; and
   are accommodated in respective guide receptacles on the outer side of the objective for the longitudinal adjustment of the objective in the tube area along the optical axis and for focusing.

21. The camera as recited in claim 13, wherein:
the contact areas include the three contact areas;
the sensor carrier includes on its front side the three mounting areas that rest against the three contact areas of the front housing part; and
the imager module rests against the camera housing only in the three mounting areas.

22. A method for producing a camera that includes an imager module and a camera housing, the camera housing including a front housing part with contact areas and a rear housing part, the method comprising:
   providing the imager module, wherein the imager module includes:
      a sensor carrier including (i) a front side with mounting areas and (ii) a backside;
      an image sensor mounted on the front side of the sensor carrier;
      an objective holder fixed in place on the sensor carrier; and
      an objective accommodated in the objective holder;
   providing the front housing part;
   inserting the imager module into the front housing part, with the mounting areas of the sensor carrier being placed on or joined to the contact areas of the front housing part in a direction of an optical axis of the imager module;
   placing the rear housing part on the backside of the sensor carrier; and
   fastening the rear housing part to the front housing part, thereby fixing a position of the imager module relative to the camera housing;
   wherein at least one of:
      (a) a pitch angle position and a yaw angle position of the imager module with respect to two respective axes are set when the imager module is inserted into the front housing part, and a roll angle position of the imager module is set after the sensor carrier of the imager module has been inserted into the front housing part by rotating the imager module about the optical axis while adjusting a position of the mounting areas relative to the contact areas; and
      (b) the sensor carrier is made from metal, the contact areas are metallic, the image sensor is placed directly on the front side of the sensor carrier, and the mounting areas of the sensor carrier are placed against the metallic contact areas, thereby directly thermally linking the image sensor to the front housing part via the sensor carrier.

23. The method as recited in claim 22, wherein the pitch angle position and the yaw angle position of the imager module with respect to the two respective axes are set when the imager module is inserted into the front housing part, and the roll angle position of the of the imager module is set after the sensor carrier of the imager module has been inserted into the front housing part by the rotating of the imager module about the optical axis while the position of the mounting areas relative to the contact areas is adjusted.

24. The method as recited in claim 22, wherein the image sensor is placed directly on the front side of the sensor carrier, the sensor carrier is made from metal, the contact areas are metallic, and the mounting areas of the sensor carrier are placed against the metallic contact areas, thereby directly thermally linking the image sensor to the front housing part via the sensor carrier.

\* \* \* \* \*